United States Patent
Fang et al.

(10) Patent No.: US 9,740,272 B2
(45) Date of Patent: Aug. 22, 2017

(54) HARD DRIVE ENERGY-SAVING CONTROL METHOD AND APPARATUS, AND CENTRAL PROCESSING UNIT

(71) Applicant: Huawei Technologies Co., Ltd., Shenzhen, Guangdong (CN)

(72) Inventors: Qingyin Fang, Shenzhen (CN); Chaoping Qiu, Shenzhen (CN); Qiangzhi Xia, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 339 days.

(21) Appl. No.: 14/090,731

(22) Filed: Nov. 26, 2013

(65) Prior Publication Data

US 2014/0101469 A1 Apr. 10, 2014

Related U.S. Application Data (63) Continuation of application No. PCT/CN2012/082703, filed on Oct. 10, 2012.

(30) Foreign Application Priority Data

May 18, 2012 (CN) .......................... 2012 1 0156318

(51) Int. Cl.
   *G06F 1/26* (2006.01)
   *G06F 1/32* (2006.01)

(52) U.S. Cl.
   CPC .......... *G06F 1/3268* (2013.01); *G06F 1/3206* (2013.01); *Y02B 60/1246* (2013.01); *Y02B 60/32* (2013.01)

(58) Field of Classification Search
   CPC .. G06F 1/3268; G06F 1/3206; Y02B 60/1246
   (Continued)

(56) References Cited

U.S. PATENT DOCUMENTS 5,682,273 A * 10/1997 Hetzler ................. G06F 1/3221
                                                    360/69
5,774,292 A *  6/1998 Georgiou .............. G06F 1/3221
                                                    360/63
(Continued)

FOREIGN PATENT DOCUMENTS

CN         1889737 A       1/2007
CN       101364138 A       2/2009
(Continued)

OTHER PUBLICATIONS

"Micro Telecommunications Computing Architecture Short Form Specification", MicroTCA, Sep. 21, 2006, 34 pages.
(Continued)

*Primary Examiner* — Robert Cassity (57) ABSTRACT

A hard drive energy-saving control method is disclosed. The method includes: obtaining a historical working state of a hard drive in each preset time segment, where each preset time segment is each preset time segment in at least one statistic period; predicting a working state of the hard drive in a next time segment of the current time segment according to the historical working state of the hard drive; and selecting a corresponding energy-saving policy level according to the working state of the hard drive in the next time segment, and performing energy-saving control on the hard drive. Embodiments of the present invention solve the technical problem in the prior art that energy consumption of a hard drive is not correlated with actual service access traffic and the energy-saving efficiency is not optimum. The embodiments of the present invention improve the energy-saving efficiency of the hard drive.

11 Claims, 3 Drawing Sheets

(58) Field of Classification Search
USPC .................................................. 713/320, 323
See application file for complete search history.

(56) References Cited

U.S. PATENT DOCUMENTS

| | | | |
|---|---|---|---|
| 6,892,313 B1* | 5/2005 | Codilian | G06F 1/3203 |
| | | | 713/320 |
| 7,734,867 B1 | 6/2010 | Keeton et al. | |
| 2012/0005490 A1* | 1/2012 | Goraczko | G06F 1/3206 |
| | | | 713/300 |

FOREIGN PATENT DOCUMENTS

| | | |
|---|---|---|
| CN | 101441507 A | 5/2009 |
| CN | 101520689 A | 9/2009 |
| CN | 101982843 A | 3/2011 |

OTHER PUBLICATIONS

"PICMG AMC.0 R2.0 Short Form Specification", AdvancedMC, Dec. 28, 2006, 56 pages.

* cited by examiner

HARD DRIVE ENERGY-SAVING CONTROL METHOD AND APPARATUS, AND CENTRAL PROCESSING UNIT

CROSS-REFERENCE TO RELATED APPLICATIONS

This application is a continuation of International Application No. PCT/CN2012/082703, filed on Oct. 10, 2012, which claims priority to Chinese Patent Application No. 201210156318.X, filed on May 18, 2012, both of which are hereby incorporated by reference in their entireties.

TECHNICAL FIELD

The present invention relates to the field of computer technologies, and in particular, to a hard drive energy-saving control method and apparatus, and a central processing unit.

BACKGROUND

With continuous rise of data amount and storage requirements, new hard drives generally need to be added into an access storage system from time to time. However, while the hard drives in the access storage system increase, the amount of electricity consumed by them goes up continuously, and energy consumption keeps rising. Reducing storage system energy consumption (that is, computer energy consumption) is a current focus in the industry.

Currently, an advanced power management technology is used to reduce energy consumption of a storage system. The advanced power management technology is a host power management scheme based on a basic input/output system (BIOS, Basic input/output System). In this scheme, energy consumption of a device that accesses a host can be reduced, that is, a device is switched to a low-energy-consumption state in view of the working state of the device that accesses the host. However, in the existing advanced power management technologies, different devices that access the host receive a uniform power saving management manner passively, for example, the devices are suspended uniformly (that is, the display screen is powered off automatically), or the devices are suspended to a memory uniformly (that is, the system stores the current information into the memory), or the devices are suspended to a hard drive uniformly (that is, the computer is shut down automatically, before which the current data is stored onto the hard drive), and so on.

In the process of researching and practicing the prior art, the inventor of the present invention finds that in the existing implementation manners, a BIOS uniformly instructs different hard drives that access a host to enter an energy-saving state. Consequently, energy consumption of each hard drive that accesses the host does not perfectly match the traffic generated in accessing an actual service, and the overall energy-saving efficiency is undesirable.

SUMMARY

Embodiments of the present invention provide a hard drive energy-saving control method and apparatus, and also a central processing unit to implement dynamic matching between real-time power consumption of a hard drive and service access traffic and improve the energy-saving efficiency of the hard drive.

To solve the above technical problem, the embodiments of the present invention disclose the following technical solutions:

In a first aspect, a hard drive energy-saving control method is provided, where the method includes:

obtaining a historical working state of a hard drive in each preset time segment, where each preset time segment is each preset time segment in at least one statistic period;

predicting a working state of the hard drive in a next time segment of a current time segment according to the historical working state of the hard drive; and selecting a corresponding energy-saving policy level according to the working state of the hard drive in the next time segment, and performing energy-saving control on the hard drive.

In a first possible implementation manner of the first aspect, the historical working state is the historical working state in each preset time segment in one statistic period.

The predicting a working state of the hard drive in a next time segment of a current time segment according to the historical working state of the hard drive specifically includes:

determining whether the hard drive is idle in a next time segment of a time segment corresponding to the current time segment among all preset time segments in the statistic period; if yes, predicting that the working state of the hard drive in the next time segment of the current time segment is idle, and enabling the hard drive to enter an idle mode; if not, predicting that the working state of the hard drive in the next time segment of the current time segment is busy, and enabling the hard drive to enter a standby mode, where specifically, the selecting a corresponding energy-saving policy level according to the working state of the hard drive in the next time segment and the performing energy-saving control on the hard drive are: selecting the corresponding energy-saving policy level and performing energy-saving control on the idle or standby hard drive.

With reference to the first aspect or the first feasible implementation manner of the first aspect, in a second feasible implementation manner, the historical working state is the historical working state in each preset time segment in multiple statistic periods.

The predicting a working state of the hard drive in a next time segment of a current time segment according to the historical working state of the hard drive specifically includes:

collecting statistics regarding the historical working state of the hard drive in the next time segment of a time segment corresponding to the current time segment in each statistic period to obtain a statistic result;

calculating a probability of the hard drive being idle and busy in a next time segment of a time segment corresponding to a previous time segment according to the statistic result; and if the probability of the hard drive being idle in the next time segment of the time segment corresponding to the previous time segment is greater than the probability of being busy, predicting that the working state of the hard drive in the next time segment of the current time segment is idle, and enabling the hard drive to enter an idle mode; otherwise, predicting that the working state of the hard drive in the next time segment of the current time segment is busy, and enabling the hard drive to enter a standby mode, where specifically, the selecting a corresponding energy-saving policy level according to the working state of the hard drive in the next time segment and the performing energy-saving control on the hard drive are: selecting the corresponding energy-saving policy level and performing energy-saving control on the idle or standby hard drive.

With reference to the first aspect or the first or second feasible implementation manner of the first aspect, in a third feasible implementation manner, the method further includes: abstracting a historical working curve of the hard drive in the statistic period from the historical working state; and Specifically, the predicting a working state of the hard drive in a next time segment of a current time segment according to the historical working state of the hard drive is: predicting the working state of the hard drive in the next time segment of the current time segment according to the historical working curve of the hard drive.

With reference to the first aspect or the first or second or third feasible implementation manner of the first aspect, in a fourth feasible implementation manner, the abstracting a historical working curve of the hard drive from the historical working state specifically includes:

analyzing the historical working state in each preset time segment, and knowing that the historical working state of the hard drive in each preset time segment in the statistic period is idle or busy; and plotting the historical working curve of the hard drive according to the idle or busy state of the hard drive in each preset time segment in the statistic period.

With reference to the first aspect or the first or second feasible implementation manner of the first aspect, in a fifth feasible implementation manner, the method further includes:

using a cache to cache burst data if the burst data accesses the hard drive when the hard drive switches from a standby mode to a normal state after entering the standby mode.

With reference to the first aspect, or the first, second, third, fourth or fifth feasible implementation manner of the first aspect, in a sixth feasible implementation manner, the method further includes:

detecting a read or write operation on the hard drive at preset intervals in the current time segment if the historical working state of the hard drive that is obtained in each preset time segment is not sufficient or the hard drive has no historical working state;

recording that the hard drive is busy in the current time segment if any read or write operation is detected; otherwise, recording that the hard drive is idle in the current time segment; and performing energy-saving control on the hard drive in the next time segment of the current time segment according to the working state of the hard drive in the current time segment and the obtained energy-saving policy level.

In a second aspect, a hard drive energy-saving control apparatus is provided, where the apparatus includes:

an obtaining module, configured to obtain a historical working state of a hard drive in each preset time segment, where each preset time segment is each preset time segment in at least one statistic period;

a predicting module, configured to predict a working state of the hard drive in a next time segment of a current time segment according to the historical working state of the hard drive; and an energy-saving control module, configured to select a corresponding energy-saving policy level according to the working state of the hard drive in the next time segment and perform energy-saving control on the hard drive.

In a first feasible implementation manner of the second aspect, when the historical working state is the historical working state in each preset time segment in one statistic period, the predicting module includes:

a first judging module, configured to determine whether the hard drive is idle in a next time segment of a time segment corresponding to the current time segment among all preset time segments in one statistic period; and a first determining module, configured to: if the first judging module determines that the working state of the hard drive is idle in the next time segment of the current time segment, predict that the working state of the hard drive in the next time segment of the current time segment is idle, and enable the hard drive to enter an idle mode; otherwise, predict that the working state of the hard drive in the next time segment of the current time segment is busy, and enable the hard drive to enter a standby mode, where the energy-saving control module is specifically configured to select the corresponding energy-saving policy level and perform energy-saving control on the hard drive determined by the first determining module as idle or standby.

With reference to the second aspect or the first feasible implementation manner of the second aspect, in a second feasible implementation manner, when the historical working state is the historical working state in each preset time segment in multiple statistic periods, the predicting module includes:

a statistics module, configured to collect statistics regarding the historical working state of the hard drive in the next time segment of a time segment corresponding to the current time segment in each statistic period to obtain a statistic result;

a calculating module, configured to calculate a probability of the hard drive being idle and busy in a next time segment of a time segment corresponding to a previous time segment according to the statistic result;

a second judging module, configured to determine whether a probability of the hard drive being idle in a next time segment of a time segment corresponding to a previous time segment is greater than a probability of being busy; and a second determining module, configured to: if the second judging module determines that the probability of the hard drive being idle in the next time segment of the time segment corresponding to the previous time segment is greater than the probability of being busy, predict that the working state of the hard drive in the next time segment of the current time segment is idle, and enable the hard drive to enter an idle mode; otherwise, predict that the working state of the hard drive in the next time segment of the current time segment is busy, and enable the hard drive to enter a standby mode, where the energy-saving control module is specifically configured to select the corresponding energy-saving policy level and perform energy-saving control on the hard drive determined by the second determining module as idle or standby.

With reference to the second aspect or the first or second feasible implementation manner of the second aspect, in a third feasible implementation manner, the following modules are further included:

an abstracting module, configured to abstract a historical working curve of the hard drive in the statistic period according to the historical working state obtained by the obtaining module, where the predicting module is specifically configured to predict the working state of the hard drive in the next time segment of the current time segment according to the historical working curve of the hard drive.

With reference to the second aspect or the first or second or third feasible implementation manner of the second aspect, in a fourth feasible implementation manner, the abstracting module includes:

an analyzing module, configured to analyze the historical working state obtained by the obtaining module in each preset time segment in the statistic period, and know that the historical working state of the hard drive in each preset time segment in the statistic period is idle or busy; and a plotting module, configured to plot a historical working curve of the hard drive according to the idle or busy state of the hard drive that is obtained by the analyzing module in each preset time segment in the statistic period.

With reference to the first or second feasible implementation manner of the second aspect, in a fifth feasible implementation manner, the following module is further included:

a caching module, configured to cache burst data if the burst data accesses the hard drive when the hard drive switches from a standby mode to a normal state after the first determining module or the second determining module determines that the hard drive enters the standby mode.

With reference to the second aspect, or the first, second, third, fourth or fifth feasible implementation manner of the second aspect, in a sixth feasible implementation manner, the following modules are further included:

a detecting module, configured to detect a read or write operation on the hard drive at preset intervals in the current time segment if the historical working state of the hard drive that is obtained by the obtaining module in each preset time segment is not sufficient or the hard drive has no historical working state; and a recording module, configured to: record that the hard drive is busy in the current time segment if the detecting module detects any read or write operation on the hard drive; and record that the hard drive is idle in the current time segment if the detecting module detects no read or write operation on the hard drive, where the energy-saving control module is further configured to select the corresponding energy-saving policy level according to whether the hard drive is busy or idle in the current time segment, and perform energy-saving control on the hard drive in the next time segment of the current time segment.

In a third aspect, a central processing unit is provided, including an energy-saving policy setting apparatus and a hard drive energy-saving control apparatus, where:

The energy-saving policy setting apparatus is configured to set a hard drive energy-saving policy level and send the hard drive energy-saving policy level to the hard drive energy-saving control apparatus; and the hard drive energy-saving control apparatus is configured to: obtain a historical working state of a hard drive in each preset time segment, and a working state of the hard drive in a current time segment, where each preset time segment is each preset time segment in at least one statistic period; predict a working state of the hard drive in a next time segment of the current time segment according to the historical working state of the hard drive; and select a corresponding energy-saving policy level according to the working state of the hard drive in the next time segment, and perform energy-saving control on the hard drive.

In the first feasible implementation manner of the third aspect, the hard drive energy-saving control apparatus is the hard drive energy-saving control apparatus described above.

It can be seen from the above technical solutions, in the embodiments of the present invention, by monitoring operations of a user of accessing a hard drive, a future working state of the hard drive is predicted dynamically with reference to historical access of a service to the hard drive, and the hard drive is controlled to enter a corresponding energy-saving mode. That is, in the embodiments of the present invention, a working mode (that is, an idle or standby mode) of the hard drive is determined according to operation data about historical access to the hard drive, and then a corresponding energy-saving policy is selected to perform energy-saving control on the hard drive. In this way, the real-time power consumption of the hard drive matches the service access traffic dynamically, thereby reducing futile power consumed when no data access is active, and improving the energy-saving efficiency of the hard drive.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from the accompanying drawings without creative efforts.

DESCRIPTION OF EMBODIMENTS

The following clearly describes the technical solutions in the embodiments of the present invention with reference to the accompanying drawings in the embodiments of the present invention. It is obvious that the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
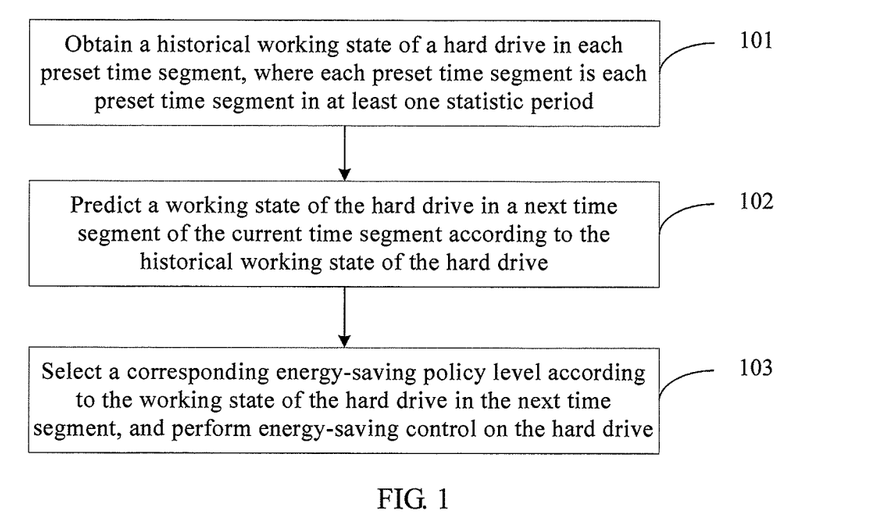
FIG. 1 is a flowchart of a hard drive energy-saving control method according to an embodiment of the present invention.

Refer to FIG. 1, which is a flowchart of a hard drive energy-saving control method according to an embodiment of the present invention. The method includes the following steps:

Step 101: Obtain a historical working state of a hard drive in each preset time segment, where each preset time segment is each preset time segment in at least one statistic period.

In this step, a callback interface for calling back hard drive operations may be registered onto user management software to collect the working state of the hard drive in each time segment before the current time segment (called a historical working state herein), that is, operation data of accessing the hard drive, where the working state includes an idle state, a busy state, and so on. It can also collect the working state of the hard drive in the current time segment, that is, whether the hard drive is busy or idle currently.

In this embodiment, the method of collecting the historical working state of a hard drive in each preset time segment in at least one statistic period comes in many types. The following gives an example of the collection method, which shall not be construed as a limitation. The method is detailed below:

Assuming that the hard drive access operations in a week are collected, 7×24 hours in a week maybe divided into N time segments; collect operations of a user of accessing the hard drive in each of N time segments in a week as historical data, and plot a historical working curve out of the historical data, and then predict whether the user will access the hard drive in the next time segment of the current time segment according to the historical working curve.

Preset statistic period: one week.

Divide statistics of one week into 7 sample sets:

$X_1$:{ . . . }: Statistics of Monday
$X_2$:{ . . . }: Statistics of Tuesday
$X_3$:{ . . . }: Statistics of Wednesday
$X_4$:{ . . . }: Statistics of Thursday
$X_5$:{ . . . }: Statistics of Friday
$X_6$:{ . . . }: Statistics of Saturday
$X_7$:{ . . . }: Statistics of Sunday In 24 hours of a day, the statistics are collected every 5 minutes (this embodiment takes 5 minutes as an example, and it can also be determined as any value by actual conditions), and the statistics are primarily about the idle state of the hard drive in this time segment. Therefore, the statistics from Monday to Sunday are:

$$X_1 = \{p_{1,1}, p_{1,2}, \ldots, p_{1,288}\}$$
$$X_2 = \{p_{2,1}, p_{2,2}, \ldots, p_{2,288}\}$$
$$\vdots$$
$$X_7 = \{p_{7,1}, p_{7,2}, \ldots, p_{7,288}\}$$

where Pi,j means that the hard drive is idle in time segment j on weekday i, and the hard drive is busy in other time segments.

Figure 2:
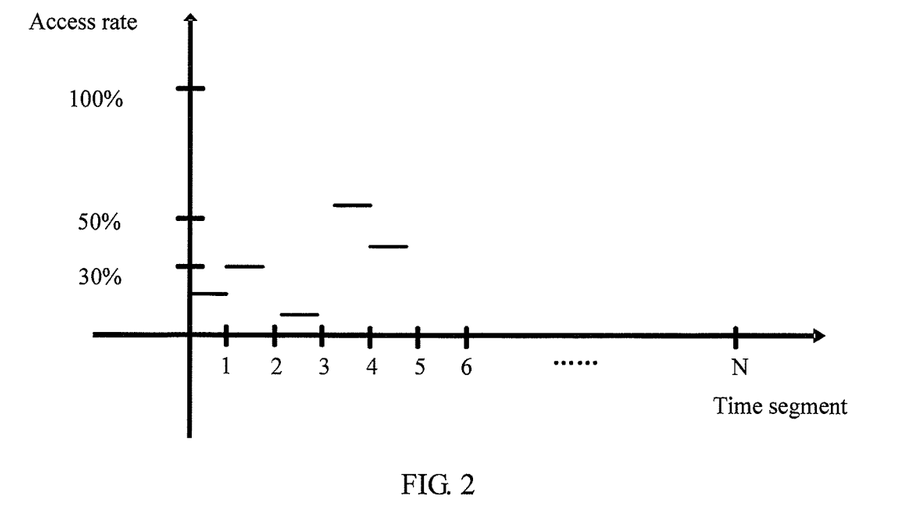
FIG. 2 is a diagram of abstracting a historical working curve of each time segment of a hard drive according to an embodiment of the present invention.

The historical working curve of the hard drive in each time segment is abstracted. As shown in FIG. 2, the x-coordinate represents N divided time segments, and the y-coordinate represents a hard drive access rate.

Step 102: Predict a working state of the hard drive in a next time segment of a current time segment according to the historical working state of the hard drive.

Analyze the historical working state of each preset time segment first to know whether the historical working state of the hard drive in each time segment is idle or busy. Definitely, in this embodiment, a historical working curve of the hard drive may also be plotted according to the idle or busy state of the hard drive in each preset time segment, but the historical working curve is not a limitation. For example, the idle or busy state of the hard drive in each time segment may also be recorded into a preset hard drive state record table for future use, which is not restricted in this embodiment.

That is, in this embodiment, the working mode of hard drive in the time segment may be determined according to statistics regarding the historical working state of the hard drive in each time segment, or according to the plotted historical working curve. The specific process is:

Determine whether the hard drive is idle in a next time segment of a time segment corresponding to the current time segment on the historical working curve; if yes, predict that the working state of the hard drive in the next time segment of the current time segment is idle, and enable the hard drive to enter an idle (idle) mode; if not, predict that the working state of the hard drive in the next time segment of the current time segment is busy, and enable the hard drive to enter a standby (standby) mode.

That is, no matter whether the working state of the hard drive in the current time segment is idle or busy, only if it is determined that the hard drive is idle in the next time segment of the time segment corresponding to the current time segment on the historical working curve, predict that the hard drive is idle in the next time segment, and enable the hard drive to enter the idle mode; otherwise, predict that the hard drive is busy in the next time segment, and enable the hard drive to enter the standby mode.

Step 103: Select a corresponding energy-saving policy level according to the working state of the hard drive in the next time segment, and perform energy-saving control on the hard drive.

Specifically, select the corresponding energy-saving policy level and perform energy-saving control on the hard drive that is in the idle or standby mode.

That is, after the hard drive enters the idle or standby mode, perform energy-saving control on the hard drive that is in the idle or standby mode according to the selected energy-saving policy level.

In the embodiment of the present invention, the selected energy-saving policy level may be obtained beforehand, or the energy-saving policy level may be obtained when the energy-saving control is required, which is not restricted in the embodiment. The energy-saving policy level is an energy-saving action taken for the hard drive according to the working state of the hard drive, an energy consumption state, the working mode in use, and time required for recovering a normal mode. For example, if the hard drive enters the idle mode, the energy-saving policy level 0 may be selected. Besides, defragmentation may be performed or a file management operation may be repeated under this energy-saving mode. The specific energy-saving policy level applied to each mode is shown in Table 1.

TABLE 1

| Working state | Energy consumption state | Mode description | Time to recovery | Energy-saving action |
|---|---|---|---|---|
| D0 | P0 | Normal Normal | 0 | The hard drive works normally, and no energy-saving action is taken |
| D1 | P1 | Idle idle | 0 | The energy-saving policy level is level 0; When the hard drive is idle, this energy-saving mode is applicable; Under this mode, defragmentation may be performed or the file management operation may be repeated |
| D2 | P2 | Standby standby | Less than 1 ms | The energy-saving policy level is level 1, 2, or 3; When the hard drive is idle, this energy-saving mode is applicable; Under this mode, defragmentation may be performed or the file management operation may be repeated |
| D3 | P3 | Sleep sleep | 2.5 S | The time to recovery is too long, and data access is risky. This state is not required for the moment |

In the embodiment of the present invention, by monitoring operations of a user of accessing a hard drive, a future working state of the hard drive is predicted dynamically with reference to historical access of a service to the hard drive, and the hard drive is controlled to enter a corresponding energy-saving mode. That is, in the embodiment of the present invention, a historical working state of the hard drive is abstracted according to operation data about historical access to the hard drive, and the working mode (that is, an idle or standby mode) of the hard drive is determined according to the historical working state, and then a corresponding energy-saving policy is selected to perform energy-saving control on the hard drive. In this way, the real-time power consumption of the hard drive matches the service access traffic dynamically, thereby reducing futile power consumed when no data access is active, and improving the energy-saving efficiency of the hard drive.

Optionally, in the above embodiment, if the historical working state is the historical working state in each preset time segment in one statistic period, the predicting the working state of the hard drive in the next time segment of the current time segment according to the historical working state of the hard drive specifically includes: determining whether the hard drive is idle in the next time segment of a time segment corresponding to the current time segment among all preset time segments in the statistic period; if yes, predicting that the working state of the hard drive in the next time segment of the current time segment is idle, and enabling the hard drive to enter an idle mode; if not, predicting that the working state of the hard drive in the next time segment of the current time segment is busy, and enabling the hard drive to enter a standby mode;

Specifically, the selecting a corresponding energy-saving policy level according to the working state of the hard drive in the next time segment and the performing energy-saving control on the hard drive are: selecting the corresponding energy-saving policy level and performing energy-saving control on the idle or standby hard drive.

Optionally, if the historical working state is the historical working state in each preset time segment in multiple statistic periods, the predicting the working state of the hard drive in the next time segment of the current time segment according to the historical working state of the hard drive specifically includes: collecting statistics regarding historical working states of the hard drive in the next time segment of the time segment corresponding to the current time segment in each statistic period to obtain a statistic result; calculating a probability of the hard drive being idle and busy in a next time segment of a time segment corresponding to a previous time segment according to the statistic result; if the probability of the hard drive being idle in the next time segment of the time segment corresponding to the previous time segment is greater than the probability of being busy, predicting that the working state of the hard drive in the next time segment of the current time segment is idle, and enabling the hard drive to enter an idle mode; otherwise, predicting that the working state of the hard drive in the next time segment of the current time segment is busy, and enabling the hard drive to enter a standby mode; and specifically, the selecting a corresponding energy-saving policy level according to the working state of the hard drive in the next time segment and the performing energy-saving control on the hard drive are: selecting the corresponding energy-saving policy level and performing energy-saving control on the idle or standby hard drive.

That is, in the embodiment of the present invention, the historical working state may be a historical working state in each preset time segment in one statistic period, or may be a historical working state in each preset time segment in multiple statistic periods, which is not restricted in the present invention.

Optionally, in the above embodiment, the method may further include: abstracting a historical working curve of the hard drive in the statistic period according to the historical working state.

Specifically, the predicting a working state of the hard drive in a next time segment of a current time segment according to the historical working state of the hard drive is: predicting the working state of the hard drive in the next time segment of the current time segment according to the historical working curve of the hard drive.

The abstracting a historical working curve of the hard drive according to the historical working state specifically includes: analyzing the historical working state in each preset time segment, and knowing that the historical working state of the hard drive in each preset time segment in the statistic period is idle or busy; and plotting a historical working curve of the hard drive according to the idle or busy state of the hard drive in each preset time segment in the statistic period.

Optionally, if burst traffic occurs when the hard drive enters a standby mode, the method may further include: using a cache to cache the burst data if the burst data accesses the hard drive when the hard drive switches from the standby mode to a normal state after entering the standby mode.

That is, if a duration of 1 ms is spent in switching the hard drive from the standby mode to the normal (normal) mode after the hard drive enters the standby mode, if any burst data accesses the hard drive in the duration, the data is vulnerable to loss. With the burst data cached in an operating system (OS, Operating System) or the cache (Cache), data transmission reliability is ensured.

Optionally, in the above embodiment, the method may further include: detecting a read or write operation on the hard drive at preset intervals in the current time segment if the historical working state of the hard drive that is obtained in each preset time segment is not sufficient or the hard drive has no historical working state, for example, when it is put into use for the first time; recording that the hard drive is busy in the current time segment if any read or write operation is detected; otherwise, recording that the hard drive is idle in the current time segment; and performing energy-saving control on the hard drive in the next time segment of the current time segment according to the working state of the hard drive in the current time segment and the obtained energy-saving policy level.

Definitely, in another embodiment, on the basis of the above embodiment, the method may further include: detecting the read or write operation on the hard drive at preset intervals in the current time segment if the historical working state of the hard drive that is obtained in each preset time segment is not sufficient or the hard drive has no historical working state; recording that the hard drive is busy in the current time segment if any read or write operation is detected; otherwise, recording that the hard drive is idle in the current time segment; and performing energy-saving control on the hard drive in the next time segment of the current time segment according to the working state of the hard drive in the current time segment and the obtained energy-saving policy level.

That is, in the optional embodiment, if the historical operation data of accessing the hard drive is not sufficient or no historical operation data of accessing the hard drive is available for reference, statistics regarding operation data of accessing the hard drive in a current time segment may further be collected in this embodiment to predict the operation of accessing the hard drive in a next time segment of the current time segment, as detailed below:

Initialize $P_{i,j}$ to 0 if the historical operation data of previously accessing the hard drive is not sufficient; or perform the following step directly if no operation of accessing the hard drive is performed previously:

First, collect statistics regarding the operation data $P_{i,j}$ of accessing the hard drive in the current time segment. For example, detect a read or write operation on the hard drive at intervals of 10 ms (the interval here is only an example, and may be modified as required) in time segment j of week i; record that the hard drive is busy in the current time segment by recording $P_{i,j}=1$ if any read or write operation is detected; otherwise, record that the hard drive is idle in the current time segment by recording $P_{i,j}=0$.

Afterward, predict a working curve of the hard drive in the current time segment according to whether the hard drive is busy or idle in the current time segment, where the working curve is expressed by $P_{i,j}$.

Afterward, determine a working mode of the hard drive in the current time segment by adding 1 to the working curve $P_{i,j}$ of accessing the hard drive in the current time segment:

If the hard drive is idle currently, determine whether the state (that is, $P_{i,j+1}$) of the hard drive in the next time segment of the time segment corresponding to the current time segment on the current working curve is idle; if the state is idle, that is, $P_{i,j+1}=0$, enable the hard drive to enter an idle mode; otherwise, that is, $P_{i,j+1}=1$, enable the hard drive to enter a standby mode.

If the hard drive is busy currently, determine whether the state (that is, $P_{i,j+1}$) of the hard drive in the next time segment of the time segment corresponding to the current time segment on the current working curve is idle; if the state is idle, that is, $P_{i,j+1}=0$, enable the hard drive to enter an idle mode; otherwise, that is, $P_{i,j+1}=1$, enable the hard drive to enter a standby mode.

Finally, perform energy-saving control on the hard drive that is in the idle or standby mode according to the selected energy-saving policy level.

Figure 3:
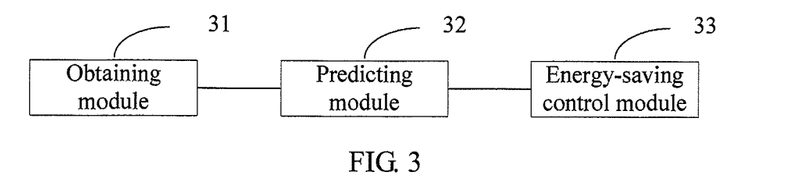
FIG. 3 is a schematic structural diagram of a hard drive energy-saving control apparatus according to an embodiment of the present invention.

Based on the process of implementing the above method, an embodiment of the present invention further provides a hard drive energy-saving control apparatus. FIG. 3 is a schematic structural diagram of the apparatus. The apparatus includes an obtaining module 31, a predicting module 32, and an energy-saving control module 33. The obtaining module 31 is configured to obtain a historical working state of a hard drive in each preset time segment, where each preset time segment is each preset time segment in at least one statistic period. In this embodiment, collecting hard drive access operation data is taken as an example. The detailed collecting process has been described earlier above, and is not repeated here any further. The predicting module 32 is configured to predict a working state of the hard drive in a next time segment of a current time segment according to the historical working state of the hard drive. The energy-saving control module 33 is configured to select a corresponding energy-saving policy level according to the working state of the hard drive in the next time segment and perform energy-saving control on the hard drive. That is, on an occasion that the hard drive enters a specific working mode, the corresponding energy-saving policy level in this working mode is selected for performing energy-saving control, thereby improving the energy-saving efficiency of the hard drive.

Figure 4:
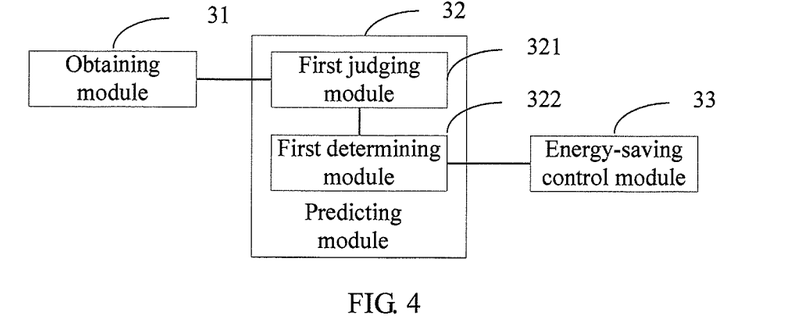
FIG. 4 is a second schematic structural diagram of a hard drive energy-saving control apparatus according to an embodiment of the present invention.

Optionally, when the historical working state is the historical working state in each preset time segment in one statistic period, the predicting module 32 includes a first judging module 321 and a first determining module 322. As a corresponding schematic structural diagram, FIG. 4 is a second schematic structural diagram of a hard drive energy-saving control apparatus according to an embodiment of the present invention.

The first judging module 321 is configured to determine whether the hard drive is idle in a next time segment of a time segment corresponding to the current time segment among all preset time segments in one statistic period. The first determining module 322 is configured to: if the first judging module 321 determines that the working state of the hard drive is idle in the next time segment of the current time segment, predict that the working state of the hard drive in the next time segment of the current time segment is idle, and enable the hard drive to enter an idle mode; otherwise, predict that the working state of the hard drive in the next time segment of the current time segment is busy, and enable the hard drive to enter a standby mode. The energy-saving control module 33 is specifically configured to select the corresponding energy-saving policy level and perform energy-saving control on the hard drive determined by the first determining module as idle or standby.

Figure 5:
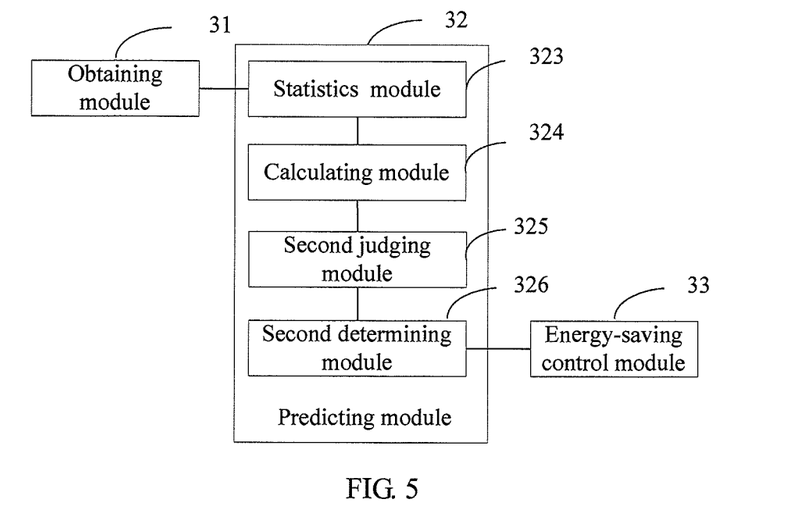
FIG. 5 is a third schematic structural diagram of a hard drive energy-saving control apparatus according to an embodiment of the present invention.

Optionally, when the historical working state is the historical working state in each preset time segment in multiple statistic periods, the predicting module 32 includes a statistics module 323, a calculating module 324, a second judging module 325, and a second determining module 326. As a corresponding schematic structural diagram, FIG. 5 is a third schematic structural diagram of a hard drive energy-saving control apparatus according to an embodiment of the present invention.

The statistics module 323 is configured to collect statistics regarding the historical working state of the hard drive in the next time segment of a time segment corresponding to the current time segment in each statistic period to obtain a statistic result; the calculating module 324 is configured to calculate a probability of the hard drive being idle and busy in a next time segment of a time segment corresponding to a previous time segment according to the statistic result; the second judging module 325 is configured to determine whether a probability of the hard drive being idle in the next time segment of a time segment corresponding to a previous time segment is greater than a probability of being busy; the second determining module 326 is configured to: if the second judging module determines that the probability of the hard drive being idle in the next time segment of the time segment corresponding to the previous time segment is greater than the probability of being busy, predict that the working state of the hard drive in the next time segment of the current time segment is idle, and enable the hard drive to enter an idle mode; otherwise, predict that the working state of the hard drive in the next time segment of the current time segment is busy, and enable the hard drive to enter a standby mode; and the energy-saving control module 33 is specifically configured to select the corresponding energy-saving policy level and perform energy-saving control on the hard drive determined by the second determining module as idle or standby.

Figure 6:
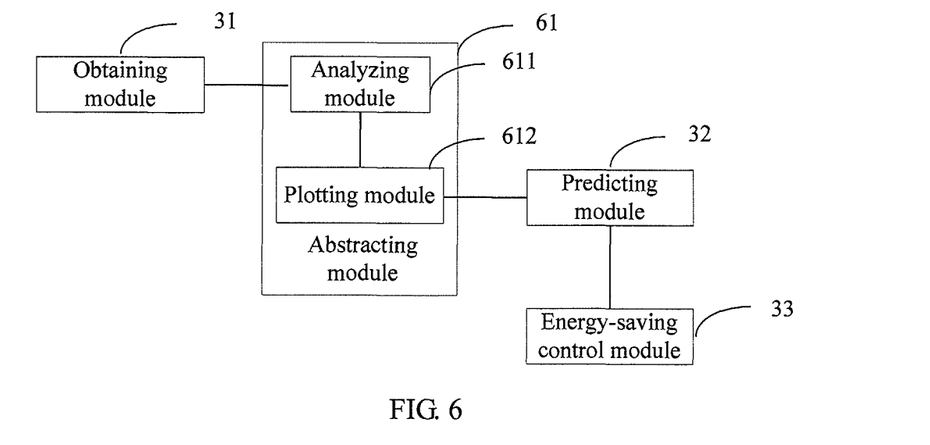
FIG. 6 is a fourth schematic structural diagram of a hard drive energy-saving control apparatus according to an embodiment of the present invention.

Optionally, in the above embodiment, the apparatus may further include: an abstracting module 61, configured to abstract a historical working curve of the hard drive in the statistic period according to the historical working state obtained by the obtaining module 31, that is, record which time segments as idle states of the hard drive and which time segments as busy states among the historical working states, and plotting them into a working curve; and the predicting module is specifically configured to predict the working state of the hard drive in the next time segment of the current time segment according to the historical working curve of the hard drive.

The abstracting module 61 includes an analyzing module 611 and a plotting module 612. The analyzing module 611 is configured to analyze the historical working state obtained by the obtaining module 31 in each preset time segment in the statistic period, and know that the historical working state of the hard drive in each preset time segment in the statistic period is idle or busy; and the plotting module 612 is configured to plot a historical working curve of the hard drive according to the idle or busy state of the hard drive that is obtained by the analyzing module in each preset time segment in the statistic period. As a corresponding schematic structural diagram, FIG. 6 is a fourth schematic structural diagram of a hard drive energy-saving control apparatus according to an embodiment of the present invention.

Optionally, the apparatus may further include a caching module, configured to cache burst data if the burst data accesses the hard drive when the hard drive switches from a standby mode to a normal state after the first determining module or the second determining module determines that the hard drive enters the standby mode.

Optionally, in the above embodiment, the apparatus may further include a detecting module and a recording module.

The detecting module is configured to detect a read or write operation on the hard drive at preset intervals in the current time segment if the historical working state of the hard drive that is obtained by the obtaining module in each preset time segment is not sufficient or the hard drive has no historical working state.

The recording module is configured to: record that the hard drive is busy in the current time segment if the detecting module detects any read or write operation on the hard drive; and record that the hard drive is idle in the current time segment if the detecting module detects no read or write operation on the hard drive.

The energy-saving control module is further configured to select the corresponding energy-saving policy level according to whether the hard drive is busy or idle in the current time segment, and perform energy-saving control in the next time segment of the current time segment.

In this embodiment, the abstracting module maybe integrated with the predicting module, or deployed independently in a network, which is not restricted in this embodiment.

Optionally, the apparatus may be integrated in a central processing unit (CPU, Central processing unit), or deployed independently, which is not restricted in this embodiment.

For the working process and functions of each module in the apparatus, refer to the corresponding implementation process in the method described above, and they will not be repeated here any further.

Figure 7:
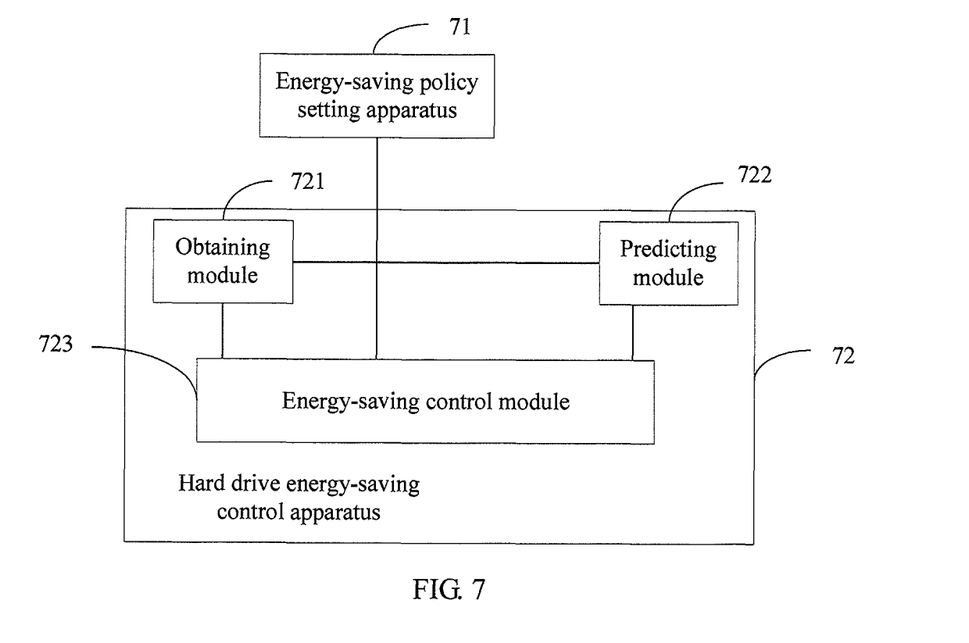
FIG. 7 is a schematic structural diagram of a central processing unit according to an embodiment of the present invention.

Correspondingly, an embodiment of the present invention further provides a central processing unit, a schematic structural diagram of which is shown in FIG. 7, including an energy-saving policy setting apparatus 71 and a hard drive energy-saving control apparatus 72.

The energy-saving policy setting apparatus 71 is configured to set a hard drive energy-saving policy level and send the hard drive energy-saving policy level to the hard drive energy-saving control apparatus 72.

The hard drive energy-saving control apparatus 72 is configured to: obtain a historical working state of a hard drive in each preset time segment, and a working state of the hard drive in a current time segment, where each preset time segment is each preset time segment is at least one statistic period; predict a working state of the hard drive in a next time segment of the current time segment according to the historical working state of the hard drive; and select a corresponding energy-saving policy level according to the working state of the hard drive in the next time segment, and perform energy-saving control on the hard drive.

Further, the hard drive energy-saving control apparatus 72 may include an obtaining module 721, a predicting module 722, and an energy-saving control module 723. The functions and purposes of the modules have been described earlier above, and are not repeated here any further. However, without being limited to the foregoing modules, the apparatus may include other modules, which are not detailed here any further.

That is, in this embodiment, the energy-saving policy setting apparatus sets a hard drive energy-saving policy level according to practical application conditions of the user, and sends the hard drive energy-saving policy level to the energy-saving control apparatus.

The obtaining module registers a hard drive operation callback interface onto user management software, and then uses the callback interface to collect the working state of the hard drive in each time segment. Afterward, the obtaining module uses a callback function to perform the following two operations on the obtained working state of the hard drive in each time segment: (a) send the working state to the predicting module as data for analyzing, and abstracting a working curve of the hard drive, and so on; (b) call the energy-saving control module 423 to wake up the hard drive or make the hard drive sleep, whereupon the predicting module analyzes the received working state of the hard drive in each time segment to know whether the hard drive is idle or busy in each time segment, that is, obtain the historical working state; and predicts the working state of the hard drive in a next time segment according to the historical working state of the hard drive, and the energy-saving control module selects the corresponding energy-saving policy level according to the working state of the hard drive in the next time segment, and performs energy-saving control on the hard drive.

Optionally, when the abstracted working curve is not accurate, the predicting module may collect data of current hard drive access operations again, and abstract the current working state according to the current hard drive access operations to obtain the current working state, and then predict the hard drive access operation in the next time segment according to the current working state. The process has been detailed above, and is not repeated here any further.

In the embodiment of the present invention, by monitoring operations of a user of accessing a hard drive, a future working state of the hard drive is predicted dynamically with reference to historical access of a service to the hard drive, and the hard drive is controlled to enter a corresponding energy-saving mode. That is, in the embodiment of the present invention, the historical working state of the hard drive is abstracted according to operation data about historical access to the hard drive, and the working mode (that is, an idle or standby mode) of the hard drive is determined according to the historical working state, and then a corresponding energy-saving policy is selected to perform energy-saving control on the hard drive. In this way, a real-time power consumption of the hard drive matches a service access traffic dynamically, thereby reducing futile power consumed when no data access is active, and improving the energy-saving efficiency of the hard drive.

It should be noted that the relational terms herein such as first and second are used only to differentiate an entity or operation from another entity or operation, and do not require or imply any actual relationship or sequence between these entities or operations. Moreover, the terms "include", "comprise", and any variation thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

According to the description of the foregoing embodiments, persons skilled in the art may clearly understand that the present invention may be implemented by software in addition to a necessary universal hardware platform or by hardware only. In most circumstances, the former is preferred. Based on such an understanding, the technical solutions in the present invention essentially, or the part contributing to the prior art may be implemented in the form of a software product. The computer software product is stored in a storage medium, such as a ROM/RAM, a magnetic disk, and an optical disk, and includes several instructions for instructing a computer device (which may be a personal computer, a server, or a network device) to perform the method described in the embodiments of the present invention or in some parts of the embodiments.

The foregoing descriptions are merely exemplary embodiments of the present invention. It should be noted that various improvements and modifications made by persons of ordinary skill in the art within the principle of the present invention shall fall within the protection scope of the present invention.

What is claimed is:

1. A hard drive energy-saving control method, comprising:
   obtaining a historical working state of a hard drive in each of a plurality of preset time segments, where each preset time segment is a preset time segment in at least one statistic period, wherein the historical working state is the historical working state in each preset time segment in at least one statistic period, the statistic period is at least a full day, and the statistic period is evenly divided into the plurality of preset time segments;
   abstracting a historical working curve of the hard drive in the statistic period according to the historical working state, wherein the historical working curve plots an access rate of the hard drive in each of the preset time segments;
   predicting a working state of the hard drive in a next time segment of a current time segment according to the historical working curve of the hard drive by:
      determining whether the hard drive is idle in a next time segment of a time segment corresponding to the current time segment among all preset time segments in the statistic period,
      if yes, predicting that the working state of the hard drive in the next time segment of the current time segment is idle, and enabling the hard drive to enter an idle mode, and
      if no, predicting that the working state of the hard drive in the next time segment of the current time segment is busy, and enabling the hard drive to enter a standby mode; and
   selecting a corresponding energy-saving policy level according to the predicted working state of the hard drive in the next time segment, and performing energy-saving control on the hard drive according to the selected energy-saving policy by selecting the corresponding energy-saving policy level and performing energy-saving control on the idle or standby hard drive.

2. The method according to claim 1, wherein:
   the historical working state is the historical working state in each preset time segment in multiple statistic periods;
   predicting the working state of the hard drive in the next time segment of the current time segment according to the historical working curve of the hard drive comprises:
   collecting statistics regarding the historical working state of the hard drive in the next time segment of a time segment corresponding to the current time segment in each statistic period to obtain a statistic result;
   calculating a probability of the hard drive being idle and busy in a next time segment of a time segment corresponding to a previous time segment according to the statistic result;
   predicting, if the probability of the hard drive being idle in the next time segment of the time segment corresponding to the previous time segment is greater than the probability of being busy, that the working state of the hard drive in the next time segment of the current time segment is idle, and enabling the hard drive to enter an idle mode; otherwise, predicting that the working state of the hard drive in the next time segment of the current time segment is busy, and enabling the hard drive to enter a standby mode; and
   selecting the corresponding energy-saving policy level according to the working state of the hard drive in the next time segment and the performing energy-saving control on the hard drive comprises:
   selecting the corresponding energy-saving policy level and performing energy-saving control on the idle or standby hard drive.

3. The method according to claim 1, wherein:
   abstracting the historical working curve of the hard drive according to the historical working state comprises:
   analyzing the historical working state in each preset time segment, and knowing that the historical working state of the hard drive in each preset time segment in the statistic period is idle or busy; and
   plotting the historical working curve of the hard drive according to the idle or busy state of the hard drive in each preset time segment in the statistic period.

4. The method according to claim 1, further comprising:
   using a cache to cache burst data if the burst data accesses the hard drive when the hard drive switches from the standby mode to a normal state after entering the standby mode.

5. The method according to claim 1, further comprising:
   detecting a read or write operation on the hard drive at preset intervals in the current time segment if the historical working state of the hard drive that is obtained in each preset time segment is not sufficient or the hard drive has no historical working state;

recording that the hard drive is busy in the current time segment if any read or write operation is detected; otherwise, recording that the hard drive is idle in the current time segment; and performing energy-saving control on the hard drive in the next time segment of the current time segment according to the working state of the hard drive in the current time segment and the obtained energy-saving policy level.

6. A hard drive energy-saving control apparatus, comprising:

an obtaining module, configured to obtain a historical working state of a hard drive in each of a plurality of preset time segments, where each preset time segment is a preset time segment in at least one statistic period, wherein the historical working state is the historical working state in each preset time segment in at least one statistic period, the statistic period is at least a full day, and the statistic period is evenly divided into the plurality of preset time segments;

an abstracting module, configured to abstract a historical working curve of the hard drive in the statistic period according to the historical working state obtained by the obtaining module, wherein the historical working curve plots an access rate of the hard drive in each of the preset time segments;

a predicting module, configured to predict a working state of the hard drive in a next time segment of a current time segment according to the historical working curve of the hard drive by:

determining whether the hard drive is idle in a next time segment of a time segment corresponding to the current time segment among all preset time segments in the statistic period, if yes, predicting that the working state of the hard drive in the next time segment of the current time segment is idle, and enabling the hard drive to enter an idle mode, and if no, predicting that the working state of the hard drive in the next time segment of the current time segment is busy, and enabling the hard drive to enter a standby mode; and an energy-saving control module, configured to select a corresponding energy-saving policy level according to the predicted working state of the hard drive in the next time segment and perform energy-saving control on the hard drive according to the selected energy-saving policy by selecting the corresponding energy-saving policy level and performing energy-saving control on the idle or standby hard drive.

7. The apparatus according to claim 6, wherein:

if the historical working state is the historical working state in each preset time segment in multiple statistic periods, the predicting module comprises:

a statistics module, configured to collect statistics regarding the historical working state of the hard drive in the next time segment of a time segment corresponding to the current time segment in each statistic period to obtain a statistic result;

a calculating module, configured to calculate a probability of the hard drive being idle and busy in a next time segment of a time segment corresponding to a previous time segment according to the statistic result;

a second judging module, configured to determine whether a probability of the hard drive being idle in the next time segment of a time segment corresponding to a previous time segment is greater than a probability of being busy; and a second determining module, configured to: if the second judging module determines that the probability of the hard drive being idle in the next time segment of the time segment corresponding to the previous time segment is greater than the probability of being busy, predict that the working state of the hard drive in the next time segment of the current time segment is idle, and enable the hard drive to enter an idle mode; otherwise, predict that the working state of the hard drive in the next time segment of the current time segment is busy, and enable the hard drive to enter a standby mode, wherein the energy-saving control module is configured to select the corresponding energy-saving policy level and perform energy-saving control on the hard drive determined by the second determining module as idle or standby.

8. The apparatus according to claim 6, wherein the abstracting module comprises:

an analyzing module, configured to analyze the historical working state obtained by the obtaining module in each preset time segment in the statistic period, and know that the historical working state of the hard drive in each preset time segment in the statistic period is idle or busy; and a plotting module, configured to plot a historical working curve of the hard drive according to the idle or busy state of the hard drive that is obtained by the analyzing module in each preset time segment in the statistic period.

9. The apparatus according to claim 6, further comprising:

a caching module, configured to cache burst data if the burst data accesses the hard drive when the hard drive switches from the standby mode to a normal state after the first determining module or the second determining module determines that the hard drive enters the standby mode.

10. The apparatus according to claim 6, further comprising:

a detecting module, configured to detect a read or write operation on the hard drive at preset intervals in the current time segment if the historical working state of the hard drive that is obtained by the obtaining module in each preset time segment is not sufficient or the hard drive has no historical working state; and a recording module, configured to: record that the hard drive is busy in the current time segment if the detecting module detects any read or write operation on the hard drive; and record that the hard drive is idle in the current time segment if the detecting module detects no read or write operation on the hard drive, wherein the energy-saving control module is further configured to select the corresponding energy-saving policy level according to whether the hard drive is busy or idle in the current time segment, and perform energy-saving control on the hard drive in the next time segment of the current time segment.

11. A central processing unit, comprising an energy-saving policy setting apparatus and a hard drive energy-saving control apparatus, wherein:

the energy-saving policy setting apparatus is configured to set a hard drive energy-saving policy level and send the hard drive energy-saving policy level to the hard drive energy-saving control apparatus; and the hard drive energy-saving control apparatus is configured to:

obtain a historical working state of a hard drive in each of a plurality of preset time segments, and a working state of the hard drive in a current time segment, where each preset time segment is a preset time segment in at least one statistic period, wherein the historical working state is the historical working state in each preset time segment in at least one statistic period, the statistic period is at least a full day, and the statistic period is evenly divided into the plurality of preset time segments;

abstract a historical working curve of the hard drive in the statistic period according to the historical working state, wherein the historical working curve plots an access rate of the hard drive in each of the preset time segments;

predict a working state of the hard drive in a next time segment of the current time segment according to the historical working curve of the hard drive by:

determining whether the hard drive is idle in a next time segment of a time segment corresponding to the current time segment among all preset time segments in the statistic period, if yes, predicting that the working state of the hard drive in the next time segment of the current time segment is idle, and enabling the hard drive to enter an idle mode, and if no, predicting that the working state of the hard drive in the next time segment of the current time segment is busy, and enabling the hard drive to enter a standby mode; and ;and select a corresponding energy-saving policy level according to the predicted working state of the hard drive in the next time segment, and perform energy-saving control on the hard drive according to the selected energy-saving policy by selecting the corresponding energy-saving policy level and performing energy-saving control on the idle or standby hard drive.

* * * * *